US010365012B2

(12) United States Patent
Koyama

(10) Patent No.: US 10,365,012 B2
(45) Date of Patent: Jul. 30, 2019

(54) FAUCET DEVICE FOR AIRCRAFT LAVATORY UNIT

(71) Applicant: The Yokohama Rubber Co., LTD., Minato-ku, Tokyo (JP)

(72) Inventor: Takashi Koyama, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 92 days.

(21) Appl. No.: 14/775,579

(22) PCT Filed: Mar. 11, 2014

(86) PCT No.: PCT/JP2014/001368
§ 371 (c)(1),
(2) Date: Sep. 11, 2015

(87) PCT Pub. No.: WO2014/141693
PCT Pub. Date: Sep. 18, 2014

(65) Prior Publication Data
US 2016/0018129 A1 Jan. 21, 2016

(30) Foreign Application Priority Data
Mar. 11, 2013 (JP) ................. 2013-047509

(51) Int. Cl.
B64D 11/02 (2006.01)
F24H 1/10 (2006.01)
(Continued)

(52) U.S. Cl.
CPC ............ *F24H 1/101* (2013.01); *B64D 11/02* (2013.01); *E03C 1/044* (2013.01);
(Continued)

(58) Field of Classification Search
CPC ...................................................... F24H 1/101
See application file for complete search history.

(56) References Cited

U.S. PATENT DOCUMENTS

2003/0021597 A1* 1/2003 Chu .................. F24H 9/2028
392/486
2003/0062364 A1 4/2003 Kikuchi et al.
(Continued)

FOREIGN PATENT DOCUMENTS

DE   10 2011 108 884   1/2013
JP   2003-106662        4/2003
(Continued)

OTHER PUBLICATIONS

International Search Report for International Application No. PCT/JP2014/001368 dated Jun. 17, 2014, 4 pages, Japan.

*Primary Examiner* — Peter Keyworth
(74) *Attorney, Agent, or Firm* — Thorpe North & Western

(57) ABSTRACT

Provided is a faucet device for an aircraft lavatory unit, wherein a second joint and a third joint are joined by inserting the third joint of a heater module into a second joint of a valve module, and screw members are used to fasten a first case and a second case. As a result, the valve module and the heater module are joined in series via the second joint and the third joint. A first connector of a controller module is joined to a third connector of the valve module and a second connector of the controller module is joined to a fourth connector of the heater module. The first joint of the valve module is joined to a water supply pipe. A fourth joint of the heater module and a faucet main body are joined via a pipe.

19 Claims, 11 Drawing Sheets

(51) Int. Cl.
  *E03C 1/044*   (2006.01)
  *H05B 3/40*    (2006.01)
  *F24H 9/14*    (2006.01)
  *F24H 9/20*    (2006.01)
  *F24D 17/00*   (2006.01)
  *F24H 9/00*    (2006.01)
  *E03C 1/02*    (2006.01)

(52) U.S. Cl.
  CPC ......... *F24D 17/0026* (2013.01); *F24H 9/001* (2013.01); *F24H 9/14* (2013.01); *F24H 9/2028* (2013.01); *H05B 3/40* (2013.01); *E03C 2001/026* (2013.01); *E03C 2201/40* (2013.01); *F24H 2250/00* (2013.01); *Y02B 30/108* (2013.01); *Y02T 50/46* (2013.01)

(56) References Cited

U.S. PATENT DOCUMENTS

| | | | |
|---|---|---|---|
| 2005/0109763 A1* | 5/2005 | Lee ........................ | B64D 11/02 219/483 |
| 2011/0185493 A1* | 8/2011 | Chen ....................... | E03C 1/057 4/623 |
| 2011/0210268 A1* | 9/2011 | Dornseifer .............. | C02F 1/325 250/436 |
| 2014/0158219 A1 | 6/2014 | Reiss et al. | |

FOREIGN PATENT DOCUMENTS

| | | |
|---|---|---|
| JP | 2004-163025 | 6/2004 |
| JP | 2004-176964 | 6/2004 |
| JP | 2008-175519 | 7/2008 |
| JP | 2009-137511 | 6/2009 |
| WO | WO 2013/014225 | 1/2013 |

* cited by examiner

FAUCET DEVICE FOR AIRCRAFT LAVATORY UNIT

TECHNICAL FIELD

The present technology relates to a faucet device for an aircraft lavatory unit.

BACKGROUND

As a faucet device that is provided in an aircraft lavatory unit, a device is known in which a hot water supply line and a water supply line are connected to a water supply tap (a faucet) and a water temperature is adjusted by mixing the hot water and the water at the water tap.

In Japanese Unexamined Patent Application Publication No. 2003-106662A, a device is disclosed in which the hot water supply line is omitted by providing a heating unit designed to heat water on a section of the water supply line that supplies water to the water supply tap. Further, in the faucet device, a water supply valve (an electromagnetic valve) is arranged in the water supply line. The water supply valve controls a discharge of the water from the water supply tap based on detection results of a hand sensor that is provided near the water supply tap.

In the above-described conventional technology, a section between the water supply tap and the heating unit and a section between the heating unit and the water supply valve are respectively joined by a pipe.

As a result, in a faucet device of a conventional aircraft lavatory unit, weight of the pipes increases, and the pipes occupy a large space.

Meanwhile, weight reduction is required for the aircraft lavatory unit from a viewpoint of fuel economy. Further, from a viewpoint of increasing the number of seats, space-saving is also required, and there is still a room for improvement with respect to the weight reduction and the space-saving of the faucet device.

Further, in order to achieve the weight reduction and the space-saving of the faucet device, it can be considered to configure the heating unit and the water supply valve in an integrated manner. However, in this case, even when one of the heating unit and the water supply valve fails, the device as a whole has to be replaced, which causes a problem of increased cost.

SUMMARY

The present technology provides a faucet device for an aircraft lavatory unit, the faucet device being advantageous in achieving weight reduction and space-saving and further in minimizing maintenance costs.

A faucet device for an aircraft lavatory unit according to the present technology is provided with a water supply channel that connects a water supply pipe and a faucet main body, a water supply valve that is disposed in the water supply channel, heater that heats water supplied from the water supply channel, and controller that perform a control of an opening and closing operation of the water supply valve and a heating operation of the heater. The faucet device for the aircraft lavatory unit includes a valve module and a heater module that are disposed in series in a section of the water supply channel. The valve module is provided with a first case, a first joint that is provided in a surface of the first case and is removably joined to the water supply channel, a second joint that is provided in the surface of the first case at a different location from that of the first joint, and a water supply valve that is integrated in the first case and connects the first joint and the second joint. The heater module is provided with a second case, a third joint that is provided in a surface of the second case and is removably joined to the second joint, a fourth joint that is provided in the surface of the second case at a different location from that of the third joint and is removably joined to the water supply channel, a water channel for heating that is integrated in the second case and connects the third joint and the fourth joint, and the heater that is integrated in the second case and heats water flowing in the water channel for heating.

According to the present technology, as the valve module and the heater module are directly joined via the second joint and the third joint, it is possible to omit a pipe that has been conventionally necessary. Further, when the water supply valve or the heater fails, it is only required to replace the valve module or the heater module, thereby keeping the costs to a minimum necessary level. Therefore, it becomes advantageous for achieving weight reduction and space-saving of a faucet device and minimizing maintenance costs thereof.

BRIEF DESCRIPTION OF THE DRAWING(S)

DETAILED DESCRIPTION

First Embodiment

Next, a first embodiment will be described with reference to the attached drawings.

Figure 1:
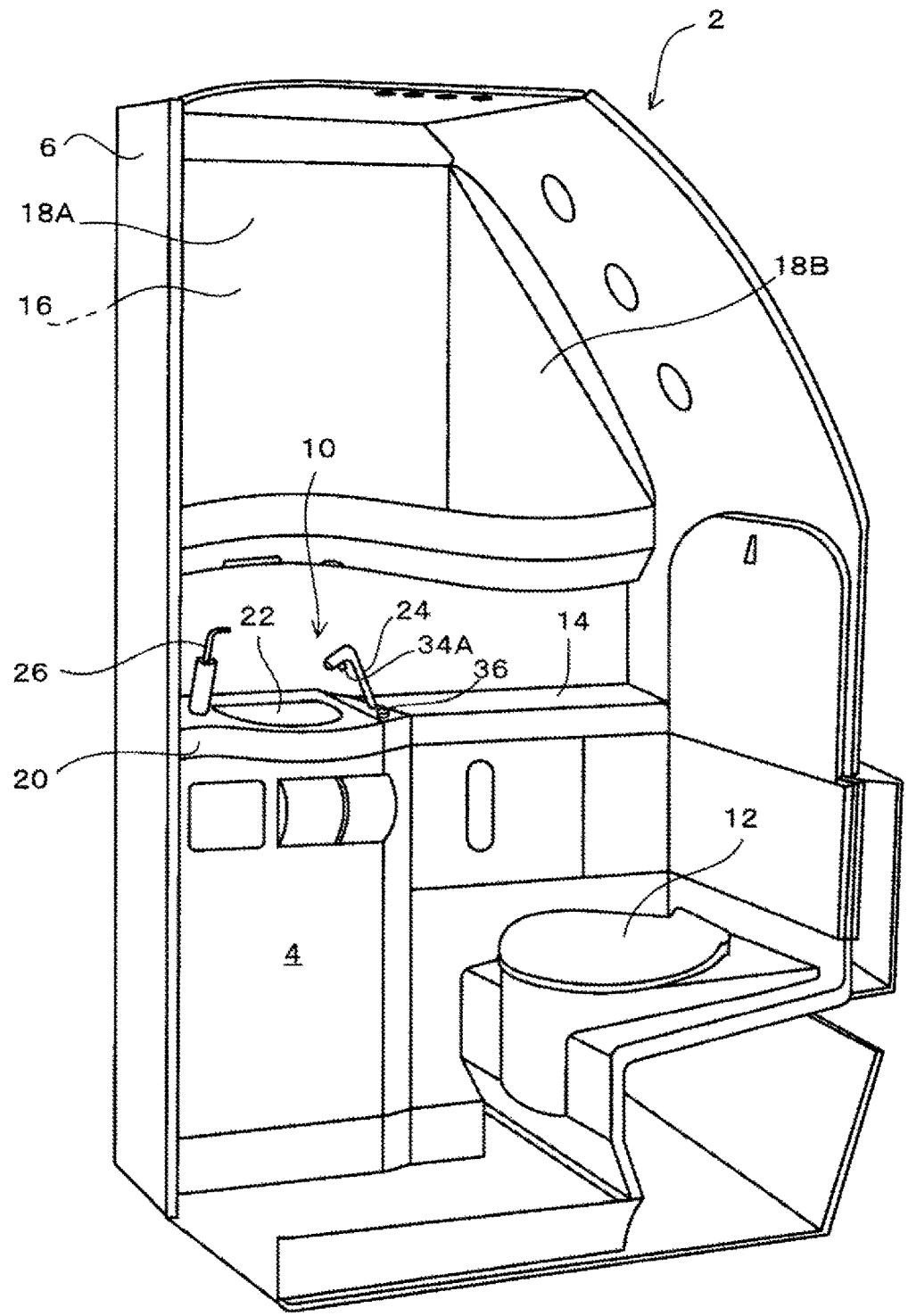
FIG. 1 is an explanatory view illustrating a configuration of an aircraft lavatory unit in which a faucet device 30A of an aircraft lavatory unit according to a first embodiment is adopted.

As illustrated in FIG. 1, an aircraft lavatory unit 2 that is installed in an aircraft is provided with a structural frame 6, inside which a lavatory 4 is compartmentalized.

The lavatory 4 is provided with a hand wash basin 10, a toilet 12, a counter 14, a storage shelf 16, two sheets of mirrors 18A and 18B that open and close the storage shelf 16, and the like.

The hand wash basin 10 is provided with a sink 20, a sink bowl 22 that is provided in the sink 20, a faucet main body 24 (a faucet) that is vertically arranged in the sink 20, and a soap water supply nozzle 26 that is vertically arranged in the sink 20.

Figure 2:
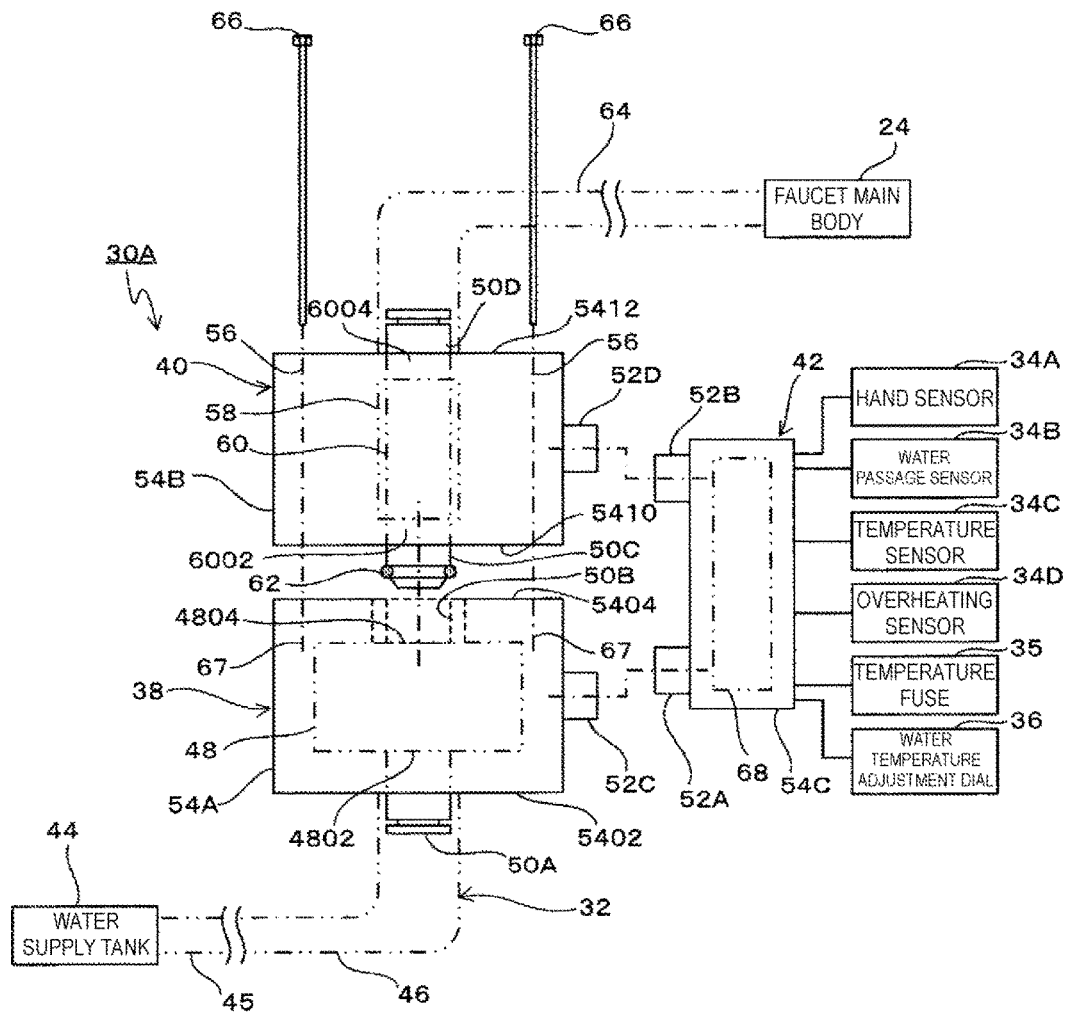
FIG. 2 is an exploded view illustrating a configuration of the faucet device 30A of the aircraft lavatory unit according to the first embodiment.

As illustrated in FIG. 2, a faucet device 30A supplies water and hot water to the faucet main body 24.

The faucet device 30A is configured by including a water supply channel 32, a hand sensor 34A, a water passage sensor 34B, a temperature sensor 34C, an overheating sensor 34D, a temperature fuse 35, a water temperature adjustment dial 36, a valve module 38, a heater module 40, and a controller module 42.

The water supply channel 32 connects a water supply pipe 46, which is connected to a water supply tank 44 via a pipe 45, and the faucet main body 24.

As illustrated in FIG. 1, the hand sensor 34A is provided in the faucet main body 24 or in a section of the sink 20 which is located near the faucet main body 24. The hand sensor 34A detects whether a hand is inserted below the faucet main body 24 and outputs the detection result to controller 68 that will be described later.

As the hand sensor 34A, various conventionally known sensors can be used, such as an infrared sensor that irradiates an infrared light and detects reflected light that is reflected by the hand, or the like.

The water passage sensor 34B detects whether or not water is flowing in the water supply channel 32 and outputs the detection result to the controller 68.

The temperature sensor 34C detects a temperature of the water flowing in the water supply channel 32 on the downstream side of the heater module 40, outputs the detection result to the controller 68, and then causes the controller 68 to perform a feedback control of the water temperature. Note that downstream indicates a direction from the water supply tank 44 to the faucet main body 24 in the water supply channel 32 that connects the faucet main body 24 and the water supply tank 44.

The overheating sensor 34D detects whether heater 58, which will be described later, of the heating module 40 has overheated and the temperature of the water flowing in the water supply channel 32 on the downstream side of the heating module 40 has reached a predetermined upper limit temperature, and outputs the detection result to the controller 68. When the controller 68 obtains the detection result from the overheating sensor 34D that indicates that the water temperature has reached the upper limit temperature, the controller 68 cuts off the power supply to the heater 58. A phenomenon in which the water temperature goes up abnormally and reaches the upper limit temperature in this manner may be caused by suspension of the water supply as well as a failure of the heating module 40.

Note that one sensor may be used as the temperature sensor 34C and the overheating sensor 34D.

Further, a thermistor can be used as the temperature sensor 34C, and a thermostat can be used as the overheating sensor 34D, for example.

Further, installation locations of the water passage sensor 34B, the temperature sensor 34C, and the overheating sensor 34D are not limited.

The temperature fuse 35 forcibly cuts off the power supply with respect to the heater 58 by fusing when the heater 58, which will be described later, of the heating module 40 has overheated.

As illustrated in FIG. 1, the water temperature adjustment dial 36 is provided in the faucet main body 24 or in a section of the sink 20 which is located near the faucet main body 24.

The water temperature adjustment dial 36 is rotationally operated to generate an operational signal for performing the adjustment of the water temperature and outputs the signal to the controller 68 that will be described later.

Instead of the water temperature adjustment dial 36, various conventionally known operating units, such as a selector switch, a selector button, or a touch panel, may be provided, the operating unit generating an operational signal for switching water and hot water and outputting the signal to the controller 68 that will be described later.

As illustrated in FIG. 2, the valve module 38 and the heater module 40 are disposed in series in a section of the water supply channel 32.

The valve module 38 is configured by including a first joint 50A that is removably joined to the water supply channel 32, a second joint 50B, a water supply valve 48 (an electromagnetic valve) that connects a section between the first joint 50A and the second joint 50B, a third connector 52C, and a first case 54A.

The water supply valve 48 is stored in the first case 54A having a rectangular box-shape, and the opening and closing operation thereof is controlled by a first control signal from the controller 68 that will be described later.

The first joint 50A is provided so as to protrude from a first outer surface 5402 of the first case 54A. The first joint 50A is connected to an opening 4802 on the upstream side of the water supply valve 48 and is removably joined to a water supply pipe 46 that is a section of the water supply channel 32 located further to the upstream side than the water supply valve 48. Note that upstream indicates a direction from the faucet main body 24 to the water supply tank 44 in the water supply channel 32 that connects the faucet main body 24 and the water supply tank 44.

The second joint 50B is a female joint. The second joint 50B is provided so as to form a concave shape in a second outer surface 5404 of the first case 54A, the second surface 5404 facing the first outer surface 5402. The second joint 50B is connected to an opening 4804 on the downstream side of the water supply valve 48.

Therefore, a portion of the water supply channel 32 is configured by the first joint 50A, the water supply valve 48, and the second joint 50B.

The third connector 53C is removably joined to a first connector 52A of the controller module 42, which will be described later, and outputs to the water supply valve 48 the first control signal that is output from the controller 68 via the first connector 52A.

The first case 54A is formed of a metal material or a synthetic resin material, but, from a viewpoint of achieving weight reduction, it is preferable that the first case 54A be formed of a light-weight synthetic resin material.

In the second outer surface 5404, screw holes 67 are formed respectively on both sides of the second joint 50B so as to be positioned in parallel with a center axis of the second joint 50B.

The heater module 40 is configured by including a third joint 50C that can be attached to and removed from the second joint 50B, a fourth joint 50D that is removably joined to the water supply channel 32, a heating pipeline (a water channel for heating) 60 that connects a section between the joint 50C and the joint 50D, the heater 58, a fourth connector 52D, and a second case 54B.

The heater 58 and the heating pipeline 60 are stored in the second case 54B having a rectangular box-shape.

The heater 58 heats water flowing in the heating pipeline 60, namely, the water channel for heating.

In the present embodiment, the heater 58 is configured by an electric heater.

The electric heater may be provided outside the heating pipeline 60 or inside the heating pipeline 60.

A water heating operation of the electric heater is controlled by a second control signal output from the controller 68.

More specifically, when the electric power supplied to the electric heater per unit time is zero, the heating value of the electric heater per unit time becomes zero, and the water heating is not performed. Further, when the electric power supplied to the electric heater per unit time becomes larger, the heating value of the electric heater per unit time becomes greater, and the water temperature becomes high. Note that, as a control method of the electric power (electric current) supplied to the electric heater by the second control signal, various conventionally known control methods can be used that include a method of controlling a phase angle of an alternating current, a method of pulse-controlling the alternating current by switching, a method of controlling the magnitude of a direct current, a method of pulse-controlling the direct current, and the like.

Note that the heater 58 is not limited to the electric heater, and as the heater 58, various conventionally known heater 58 can be used that include a device that is configured by an electromagnetic coil and a heating element that generates heat using electromagnetic waves from the electromagnetic coil, and the like.

The third joint 50C is provided so as to protrude from a first outer surface 5410 of the second case 54B.

The third joint 50C is connected to an upstream end 6002 of the heating pipeline 60 and is configured so as to be removably joined to the second joint 50B. The third joint 50C is a male joint, and the reference numeral 62 in the drawing indicates an O-ring that is fitted into an outer peripheral groove of the third joint 50C.

The fourth joint 50D is provided so as to protrude from a second outer surface 5412 of the second case 54B, the second outer surface 5412 facing the first outer surface 5410.

The fourth joint 50D is provided at a downstream end 6004 of the heating pipeline 60 and is configured so as to be removably joined, via a pipe 64, to the faucet main body 24 that is a section of the water supply channel 32, the section being located further to the downstream side than the heater 58.

Therefore, a part of the water supply channel 32 is configured by the third joint 50C, the heating pipeline 60, and the fourth joint 50D.

The fourth connector 52D is removably joined to a second connector 52B of the controller module 42, which will be described later, and outputs to the heater 58 the second control signal that is output from the controller 68 via the second connector 52B.

Similarly to the first case 54A, the second case 54B is also formed of a metal material or a synthetic resin material, but, from a viewpoint of achieving the weight reduction, it is preferable that the second case 54B be formed of a light-weight synthetic resin material.

In a state in which the valve module 38 and the heater module 40 are joined in series via the second joint 50B and the third joint 50C, the second outer surface 5404, which is a portion of the first case 54A in which the second joint 50B is provided, and the first outer surface 5410, which is a portion of the second case 54B in which the third joint 50c is provided, abut against each other. In a state in which the second outer surface 5404 and the first outer surface 5410 abut against each other in this manner, screw through holes 56 are formed in the second case 54B at positions corresponding to each of the screw holes 67.

Therefore, in a state in which the valve module 38 and the heater module 40 are joined in series via the second joint 50B and the third joint 50C, the first case 54A and the second case 54B are configured so as to be fastened, in a direction that causes the second outer surface 5404 and the first outer surface 5410 to abut against each other, via screw members 66 that are inserted into the screw through holes 56 so as to be screwed into the screw holes 67.

The controller module 42 is configured by including the controller 68, the first connector 52A, the second connector 52B, and a third case 54C.

The controller 68 is stored in the third case 54C having a rectangular box-shape.

The controller 68 controls the opening and closing operation of the water supply valve 48 based on the detection result of the hand sensor 34A, and controls the heating operation of the heater 58 based on the operational signal of the water temperature adjustment dial 36.

Further, the temperature of the water discharged from the faucet main body 24 is controlled by the detection operation of the water passage sensor 34B, the detection operation of the temperature sensor 34C, the detection operation of the overheating sensor 34D, and the presence/absence of the fusing of the temperature fuse 35.

More specifically, when conditions are satisfied, namely, when a hand is detected by the hand sensor 34A and a passage of water is detected by the water passage sensor 34B, the controller 68 performs a feedback control of the heating operation of the heater 58 so that the water temperature detected by the temperature sensor 34C becomes equal to a predetermined temperature.

Further, when the water temperature detected by the overheating sensor 34D exceeds the upper limit temperature, the controller 68 performs a control to stop the heating operation of the heater 58 (a first-stage overheating prevention control) in order to inhibit the heater 58 from overheating. Note that, when the water temperature detected by the overheating sensor 34D is lower than the upper limit temperature, the controller is automatically restored to a normal temperature control (a feedback control) that controls the heating operation of the heater 58 based on the operational signal of the water temperature adjustment dial 36 and the water temperature detected by the temperature sensor 34C.

Further, when the temperature fuse 35 has fused, the heating operation of the heater 58 is irreversibly stopped (a second-stage overheating prevention control) as a result of the electric power supply to the heater 58 being cut off.

The first connector 52A is formed so as to protrude from the outer surface of the third case 54C and is configured so as to be able to be attached to and removed from the third connector 52C. The first connector 52A outputs the first control signal to the water supply valve 48 via the third connector 52C.

The second connector 52B is formed so as to protrude from the outer surface of the third case 54C and is configured so as to be able to be attached to and removed from the fourth connector 52D. The second connector 52B outputs the second control signal to the heater 58 from the controller 68 via the fourth connector 52D.

Similarly to the first case 54A, the third case 54C is also formed of a metal material or a synthetic resin material, but, from a viewpoint of achieving the weight reduction, it is preferable that the third case 54C be formed of a light-weight synthetic resin material.

An assembly of the faucet device 30A of the aircraft lavatory unit 2 is performed in a manner described below.

The second joint 50B and the third joint 50C are joined by inserting the third joint 50C of the heater module 40 into the second joint 50B of the valve module 38, and the screw members 66 are used to fasten together the first case 54A and the second case 54B. As a result, the valve module 38 and the heater module 40 are joined in series via the second joint 50B and the third joint 50C.

Next, the first connector 52A of the controller module 42 is joined to the third connector 52C of the valve module 38, and the second connector 52B of the controller module 42 is joined to the fourth connector 52D of the heater module 40.

The first joint 50A of the valve module 38 is joined to the water supply pipe 46.

The fourth joint 50D of the heater module 40 is joined to the faucet main body 24 via the pipe 64.

Figure 3:
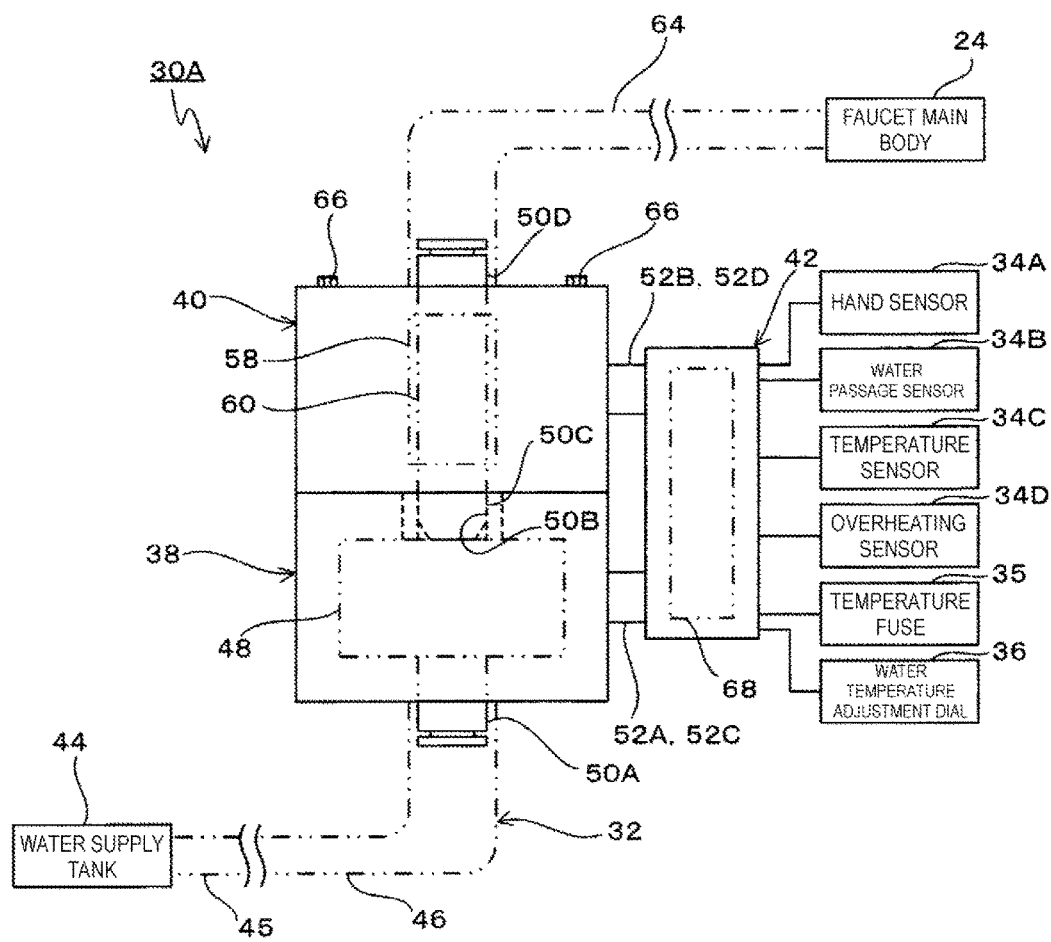
FIG. 3 is an assembly view of the faucet device 30A of the aircraft lavatory unit according to the first embodiment.

As illustrated in FIG. 3, the assembly of the faucet device 30A of the aircraft lavatory unit 2 is completed in the above-described manner, and it is advantageous for easily performing the assembly.

Note that, after the assembly, the valve module 38, the heater module 40, and the controller module 42 are stored and held in a casing that is not illustrated in the drawings, for example, and the casing is mounted in the structural frame 6 or the like.

According to the present embodiment, as the valve module 38 and the heater module 40 are directly joined to each other by the second joint 50B and the third joint 50C, it is possible to omit a pipe that has been conventionally necessary.

Further, when the water supply valve 48 or the heater 58 fails, it is only necessary to replace the valve module 38 or the heater module 40. Thereby, the replacement work is easily done while keeping costs to a minimum necessary level.

Therefore, it becomes advantageous for minimizing maintenance costs as well as achieving weight reduction and space-saving of the faucet device 30A.

Further, in the present embodiment, the controller 68 is removably joined to the water supply valve 48 via the first and third connectors 52A and 52C, and the controller 68 is removably joined to the heater 58 via the second and fourth connectors 52B and 52D. Therefore, it is possible to omit a wiring member that outputs the first control signal from the controller 68 to the water supply valve 48 and a wiring member that outputs the second control signal from the controller 68 to the heater 58.

Further, when the controller 68 fails, it is only necessary to replace the controller module 42, thereby keeping the costs to a minimum necessary level.

Therefore, it becomes even more advantageous for achieving the weight reduction and the space-saving of the faucet device 30A.

Note that, instead of joining the controller 68, the water supply valve 48, and the heater 58 via the connectors, they may be joined via the wiring members, but according to the present embodiment, it becomes advantageous for achieving the weight reduction and the space-saving.

Second Embodiment

Next, a second embodiment will be described.

The second embodiment is a modified example of the first embodiment, differing from the first embodiment with respect to a joining structure between the valve module 38 and the heater module 40, but otherwise the same as the first embodiment.

Note that in the embodiments described below, elements and members identical or similar to those of the first embodiment are assigned identical reference numerals, and descriptions thereof are omitted or described simply, while different elements from the first embodiment are mainly described.

Figure 4:
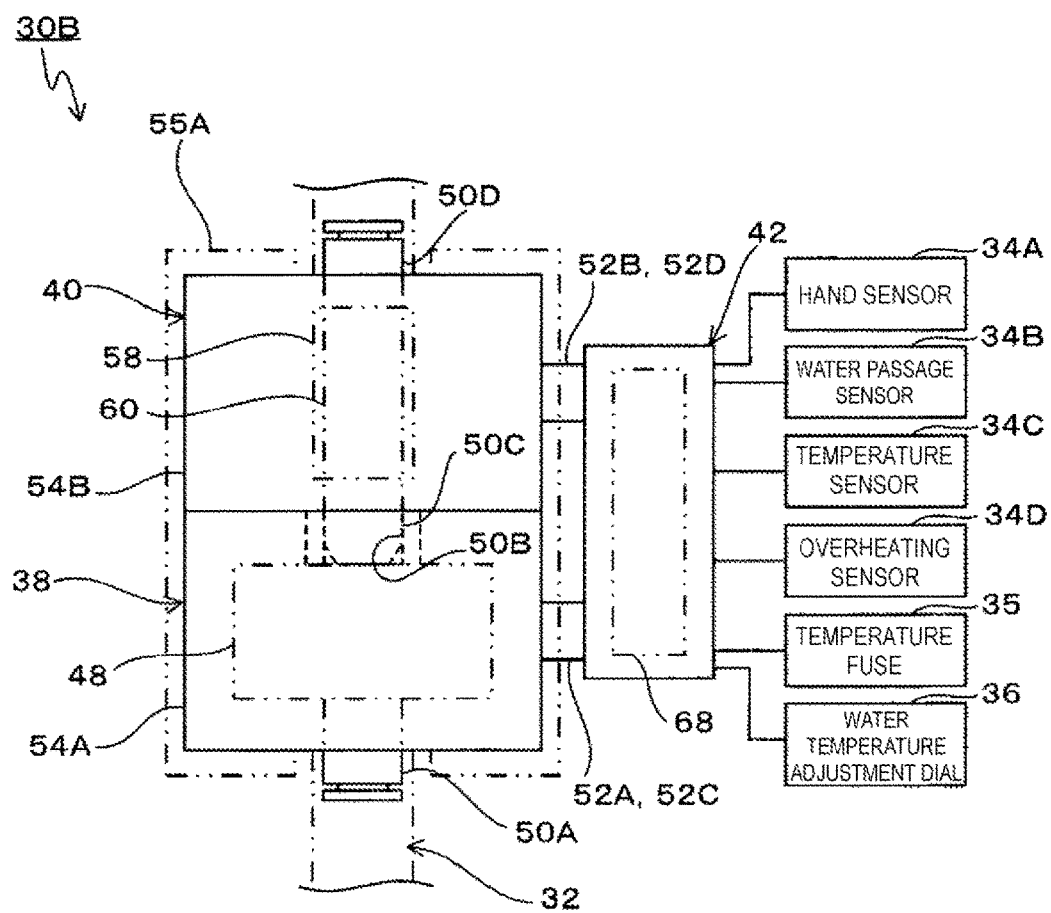
FIG. 4 is an assembly view illustrating main parts of a faucet device 30B of an aircraft lavatory unit according to a second embodiment.

As illustrated in FIG. 4, in a state in which the valve module 38 and the heater module 40 are joined in series via the second joint 50B and the third joint 50C, a faucet device 30B is provided with a holding member 55A that holds the first case 54A and the second case 54B.

The first case 54A and the second case 54B are held by the holding member 55A by being separately mounted on the holding member 55A via a screw member or a mounting fixture that is not illustrated in the drawings.

It is only necessary for the holding member 55A to hold the first case 54A and the second case 54B, and it is possible to use, as the holding member 55A, various conventionally known members, such as a cover that covers the first case 54A and the second case 54B, a frame that has an L-shaped cross-section, and the like.

Third Embodiment

Next, a third embodiment will be described.

The third embodiment is a modified example of the first embodiment, differing from the first embodiment with respect to a joining structure of the second joint and the third joint, but otherwise the same as the first embodiment.

Figure 5:
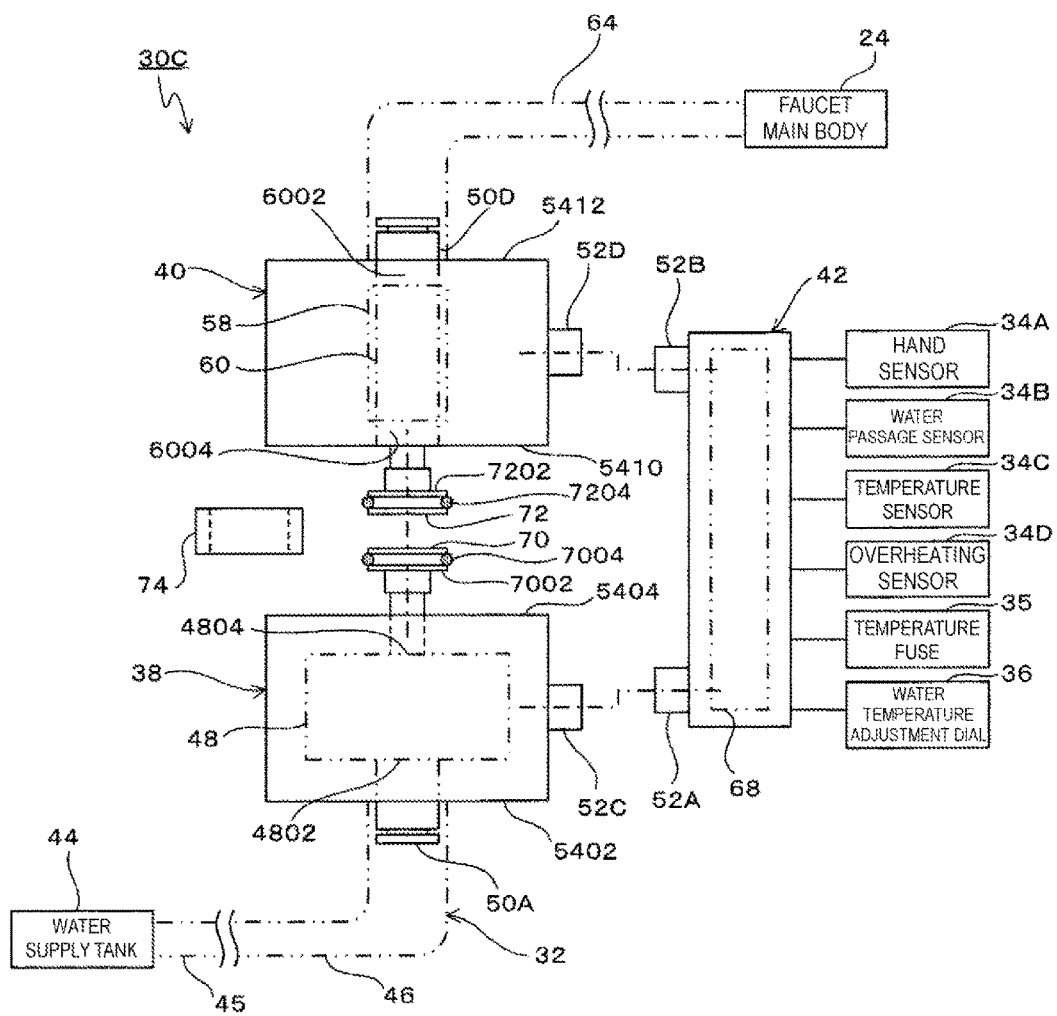
FIG. 5 is an exploded view illustrating a configuration of a faucet device 30C of an aircraft lavatory unit according to a third embodiment.
Figure 6:
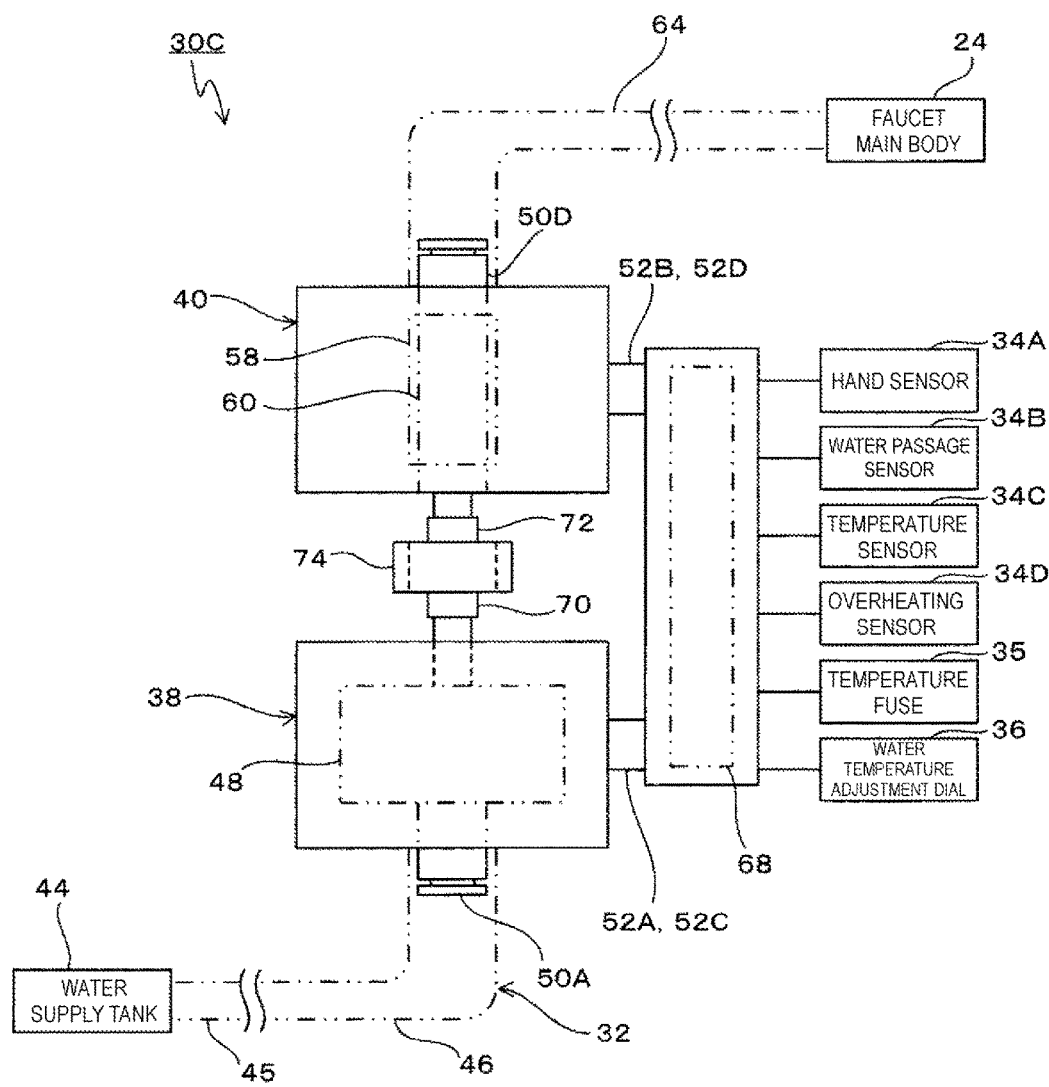
FIG. 6 is an assembly view of the faucet device 30C of the aircraft lavatory unit according to the third embodiment.

As illustrated in FIG. 5 and FIG. 6, in a faucet device 30C of the third embodiment, a second joint 70 of the valve module 38 is formed so as to protrude from the second outer surface 5404 of the first case 54A, a flange portion 7002 that has a larger diameter than that of other portions of the second joint 70 is formed at a tip end of the second joint 70, and an O-ring 7004 is fitted into a groove formed in an outer periphery of the flange portion 7002.

A third joint 72 of the heater module 40 has an identical shape to that of the second joint 70 and is formed so as to protrude from the first outer surface 5410 of the second case 54B. A flange portion 7202 that has a larger diameter than that of other portions of the third joint 72 is formed at a tip end of the third joint 72, and an O-ring 7204 is fitted into a groove formed in an outer periphery of the flange portion 7202.

A holding member (a fastener) 74 is fitted with respect to the second joint 70 and the third joint 72, in a state in which axial centers thereof are aligned with each other and tip ends thereof abut against each other, so that the holding member 74 surrounds outer peripheries of the second joint 70 and the third joint 72. As a result of the flange portions 7002 and 7202 of the second joint 70 and the third joint 72 being sandwiched by the holding member 74, the second joint 70 is joined to the third joint 72, and further, a joining state of the joints 70 and 72 is held by the holding member 74.

Therefore, in the present embodiment, the second joint 70 and the third joint 72 are configured by including the holding member 74.

As this type of combination of the second joint 70, the third joint 72, and the holding member 74, it is possible to use a commercially available quick joint (a quick release joint).

Note that in the present embodiment, the quick joint is a joint that is commercially available as a clamshell coupling, and the holding member 74 is called a clamp.

According to the third embodiment described above, a similar effect to that of the first embodiment is achieved, and further, it is more advantageous for performing easy attachment and removal of the valve module 38 to and from the heater module 40.

Note that in the first to third embodiments, although a case has been described in which the valve module 38 and the heater module 40 are disposed in this order from the upstream side toward the downstream side of the water flowing in the water supply channel 32, that order may be reversed and the heater module 40 and the valve module 38 may be disposed in this order from the upstream side toward the downstream side of the water flowing in the water supply channel 32.

In this case, the fourth joint 50D of the heater module 40 is joined to the upstream side of the water supply channel 32, the third joints 50C and 72 of the heater module 40 are joined to the second joints 50B and 70, and the first joint 50 of the valve module 38 is joined to the downstream side of the water supply channel 32.

Fourth Embodiment

Next, a fourth embodiment will be described.

Figure 7:
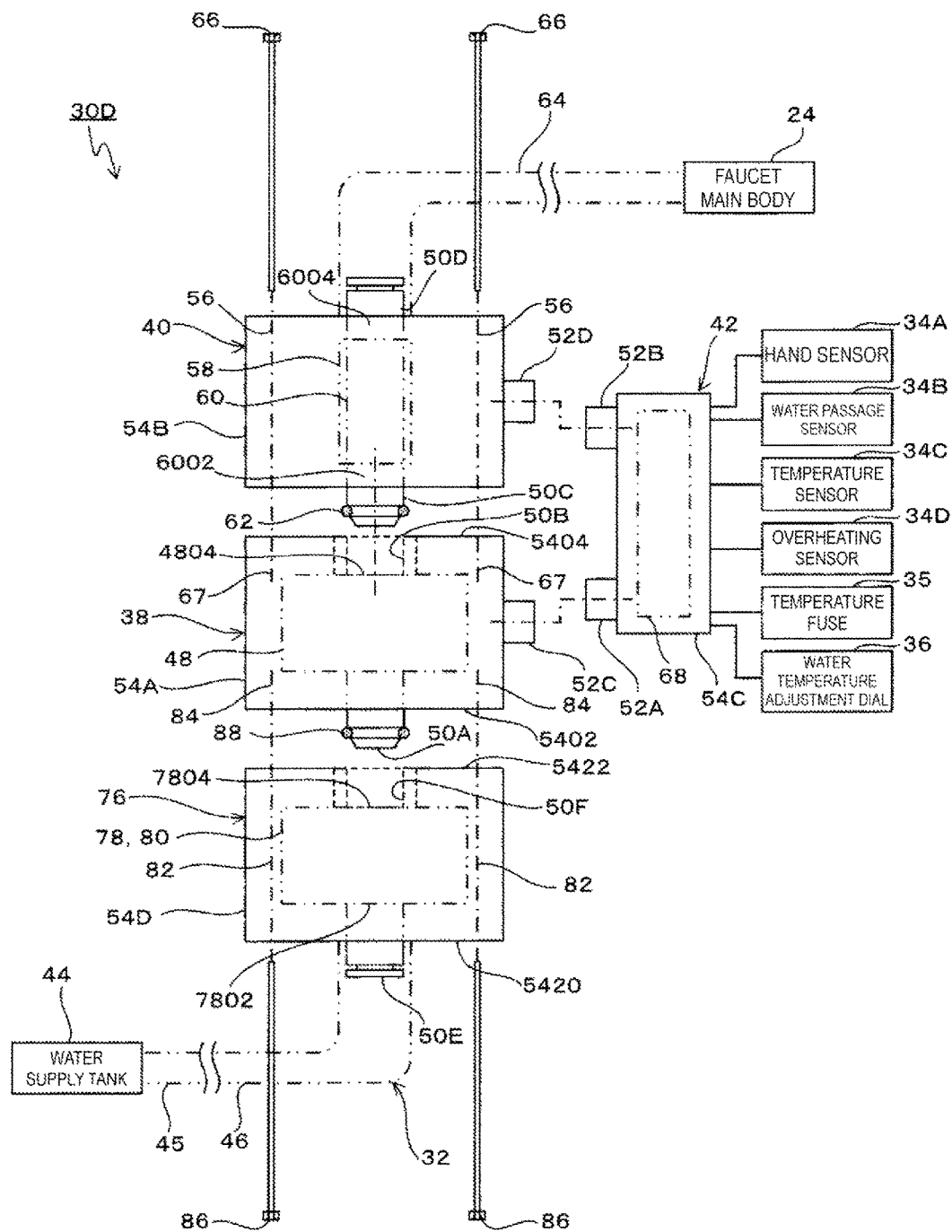
FIG. 7 is an exploded view illustrating a configuration of a faucet device 30D of an aircraft lavatory unit according to a fourth embodiment.
Figure 8:
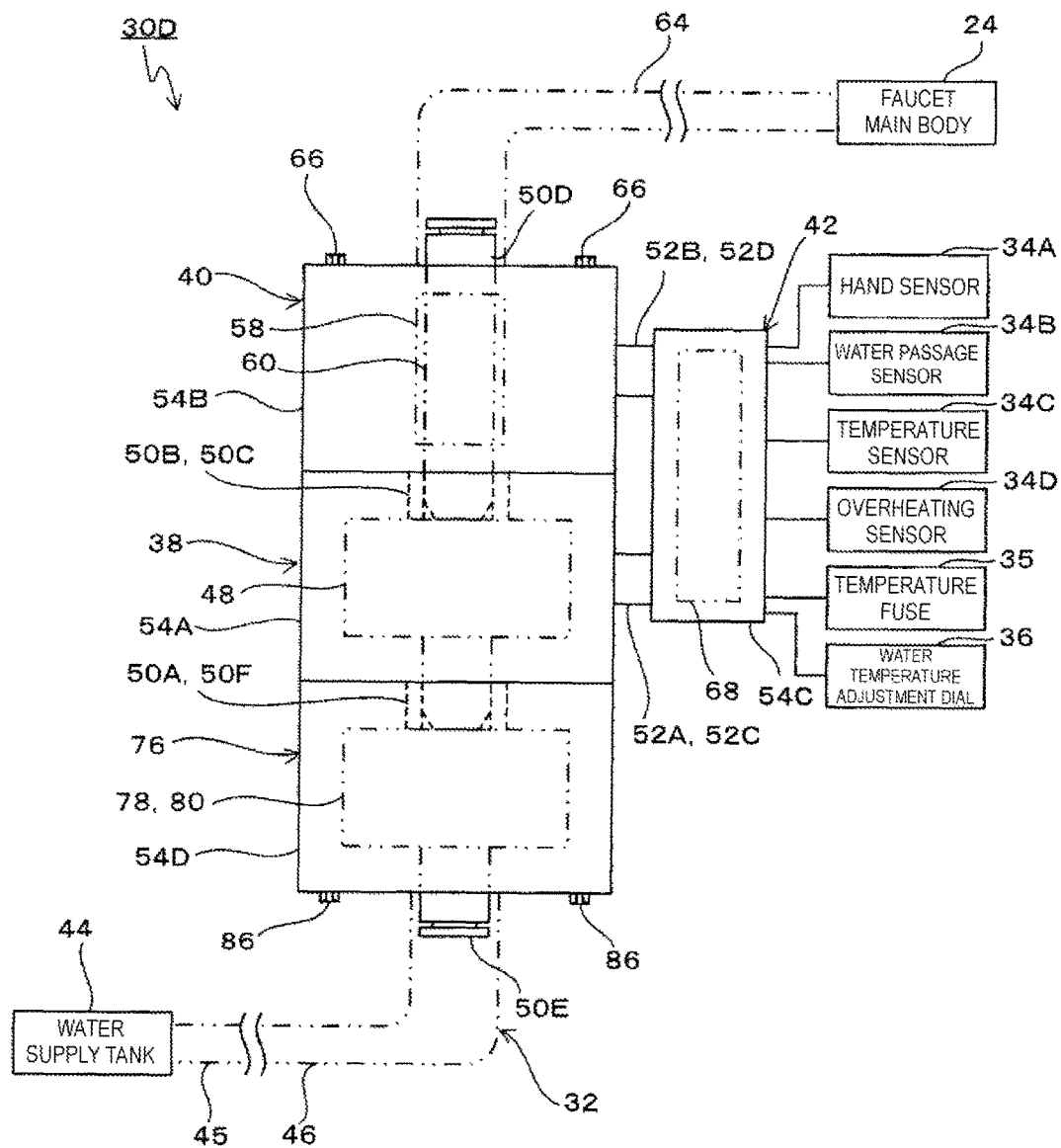
FIG. 8 is an assembly view of the faucet device 30D of the aircraft lavatory unit according to the fourth embodiment.

As illustrated in FIG. 7 and FIG. 8, the fourth embodiment differs from the first embodiment in that the fourth embodiment is further provided with a water purification module 76 that is disposed in series with the valve module 38 and the heater module 40 in a section of the water supply channel 32.

The water purification module 76 is provided with two joints, namely, fifth and sixth joints 50E and 50F that are removably joined to the water supply channel 32 or any one of the first to fourth joints 50A, 50B, 50C, and 50D, a water purification pipeline 78 (a water purification water channel) that connects a section between the joints 50E and 50F, water purifier 80, and a fourth case 54D.

The water purification pipeline 78 and the water purifier 80 are stored in the fourth case 54D having a rectangular box-shape.

The water purifier 80 is provided in the water purification pipeline 78 and purifies water flowing in the water purification pipeline 78. As the water purifier 80, conventionally known devices using various materials can be used, such as activated carbon, a filter, or the like that is provided inside the water purification pipeline 78.

In the fourth embodiment, the fifth joint 50E is provided so as to protrude from a first outer surface 5420 of the fourth case 54D, is connected to an upstream end 7802 of the water purification pipeline 78, and is removably joined to the water supply pipe 46 that is a section of the water supply channel 32, the section being located further to the upstream side than the water purification module 76.

In the fourth embodiment, the sixth joint 50F is a female joint. The sixth joint 50F is provided so as to form a concave shape in a second outer surface 5422 of the fourth case 54D, the second outer surface 5422 facing the first outer surface 5420, and is configured to be connected to a downstream end 7804 of the water purification pipeline 78, and to be removably joined to the first joint 50A of the valve module 38.

Note that in the fourth embodiment, the first joint 50A is a male joint that can be joined to the sixth joint 50F. The reference numeral 88 in the drawing indicates an O-ring that is fitted into an outer peripheral groove of the first joint 50A.

Therefore, a part of the water supply channel 32 is configured by the fifth joint 50E, the water purification pipeline 78, and the sixth joint 50F.

Similarly to the first case 54A, the fourth case 54D is also formed of a metal material or a synthetic resin material, but, from a viewpoint of achieving the weight reduction, it is preferable that the fourth case 54D be formed of a light-weight synthetic resin material.

In the fourth case 54D, screw through holes 82 are formed respectively on both sides of the sixth joint 50F so as to be positioned in parallel with a center axis of the sixth joint 50F.

In a state in which the valve module 38 and the water purification module 76 are joined in series via the first joint 50A and the sixth joint 50F, the first outer surface 5402 and the second outer surface 5422 abut against each other. In a state in which the first outer surface 5402 and the second outer surface 5422 abut against each other in this manner, screw holes 84 are formed in the first case 54A at positions corresponding to each of the screw through holes 82.

In a state in which the valve module 38 and the water purification module 76 are joined in series via the first joint 50A and the sixth joint 50F, the first case 54A and the fourth case 54D are configured so as to be fastened, in a direction that causes the second outer surface 5422 and the first outer surface 5402 to abut against each other, via screw members 86 that are inserted into the screw through holes 82 so as to be screwed into the screw holes 84.

An assembly of a faucet device 30D of the aircraft lavatory unit 2 according to the fourth embodiment is performed in a manner described below.

The first joint 50A and the sixth joint 50F are joined by inserting the first joint 50A of the valve module 38 into the sixth joint 50F of the water purification module 76, and the screw members 86 are used to fasten together the first case 54A and the fourth case 54D. As a result, the valve module 38 and the water purification module 76 are joined in series via the first joint 50A and the sixth joint 50F.

Next, the second joint 50B of the valve module 38 and the third joint 50C of the heater module 40 are joined to each other, and the screw members 66 are used to fasten together the first case 54A and the second case 54B. As a result, the valve module 38 and the heater module 40 are joined in series via the second joint 50B and the third joint 50C.

Next, the first connector 52A of the controller module 42 is joined to the third connector 52C of the valve module 38, and the second connector 52B of the controller module 42 is joined to the fourth connector 52D of the heater module 40.

The fifth joint 50E of the water purification module 76 is joined to the water supply pipe 46.

The fourth joint 50D of the heater module 40 is joined to the faucet main body 24 via the pipe 64.

The assembly of the faucet device 30D of the aircraft lavatory unit 2 is completed in the above-described manner, and it is advantageous for easily performing the assembly.

Note that, after the assembly, the water purification module 76, the valve module 38, the heater module 40, and the controller module 42 are stored and held in a casing that is not illustrated in the drawings, for example, and the casing is mounted in the structural frame 6 or the like.

According to the fourth embodiment, as the valve module 38 and the water purification module 76 are directly joined to each other by the first joint 50A and the sixth joint 50F, it is possible to omit a pipe that causes the water purifier 80 and the water supply valve 48 to be joined to each other.

Further, when any one of the water purifier 80, the water supply valve 48, and the heater 58 fails, it is only necessary to replace any one of the water purification module 76, the valve module 38, and the heater module 40. Thereby, the replacement work is easily done while keeping the costs to a minimum necessary level.

Therefore, it becomes advantageous for minimizing the maintenance costs as well as achieving the weight reduction and the space-saving.

Further, similarly to the first embodiment, as it is possible to omit the wiring member from the controller 68 and it is only necessary to replace the controller module 42 when the controller 68 fails, it becomes even more advantageous for achieving the weight reduction and the space-saving of the faucet device 30D.

Fifth Embodiment

Next, a fifth embodiment will be described.

The fifth embodiment is a modified example of the fourth embodiment, differing from the fourth embodiment in that a joining structure between the water purification module 76, the valve module 38, and the heater module 40 is a similar to that of the second embodiment in which a holding member is used, but otherwise the same as the fourth embodiment.

Figure 9:
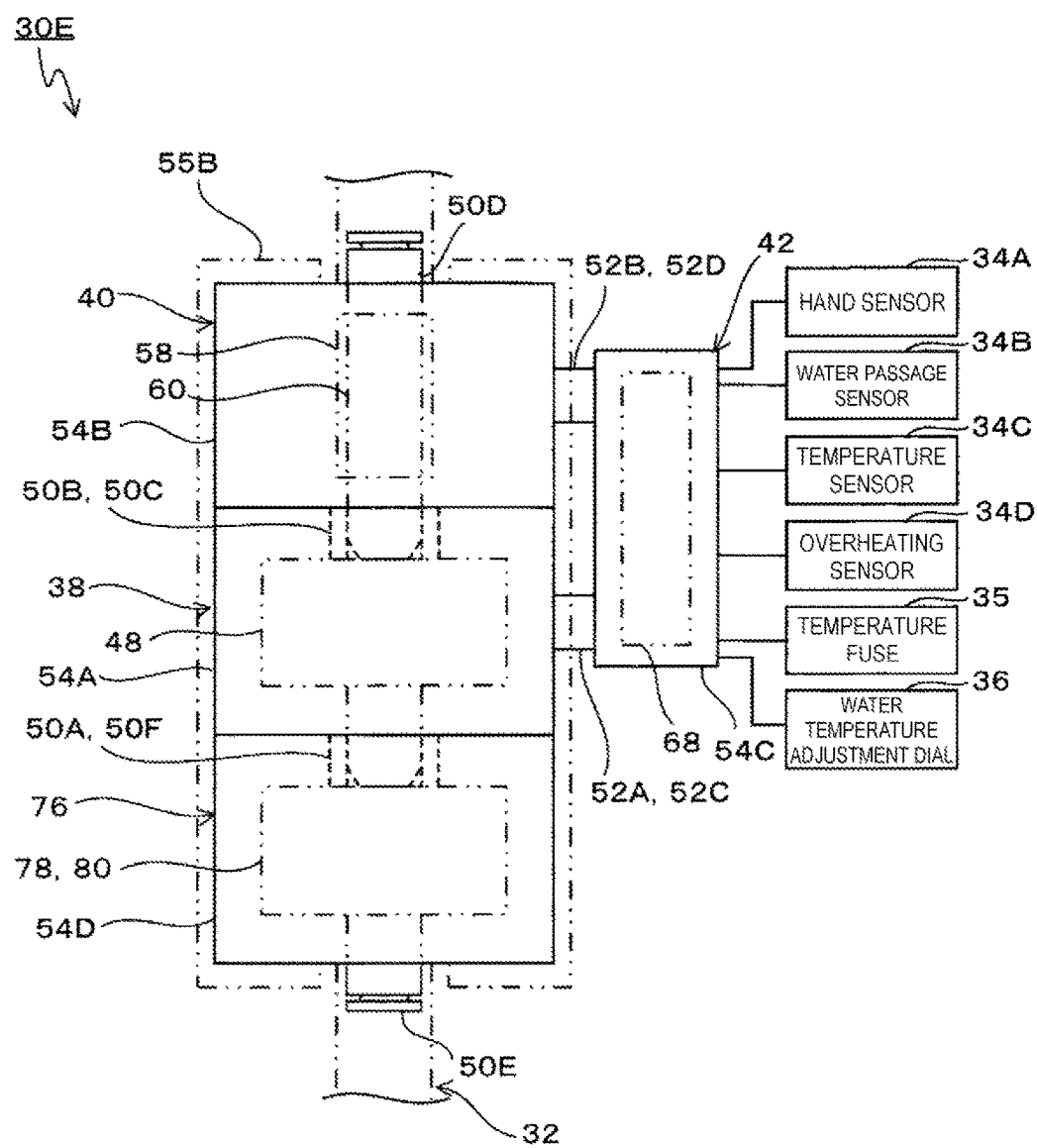
FIG. 9 is an assembly view illustrating main parts of a faucet device 30E of an aircraft lavatory unit according to a fifth embodiment.

As illustrated in FIG. 9, in a state in which the water purification module 76, the valve module 38, and the heater module 40 are joined in series via the sixth joint 50F, the first joint 50A, the second joint 50B, and the third joint 50C, a faucet device 30E is provided with a holding member 55B that holds the fourth case 54D, the first case 54A, and the second case 54B.

The first case 54A, the second case 54B, and the fourth case 50C are held by the holding member 55B by being separately mounted on the holding member 55B via a screw member or a mounting fixture that is not illustrated in the drawings.

It is only necessary for the holding member 55B to hold the first case 54A, the second case 54B, and the fourth case 54D, and it is possible to use, as the holding member 55B, various conventionally known members, such as a cover that covers the first case 54A, the second case 54B, and the fourth case 54D, a frame that has a L-shaped cross-section, and the like.

Sixth Embodiment

A sixth embodiment is a modified example of the fourth embodiment, differing from the fourth embodiment in that a joining structure between the first joint and the sixth joint is provided via a holding member similar to the third embodiment, as well as the joining structure between the second joint and the third joint, but otherwise the same as the fourth embodiment.

Figure 10:
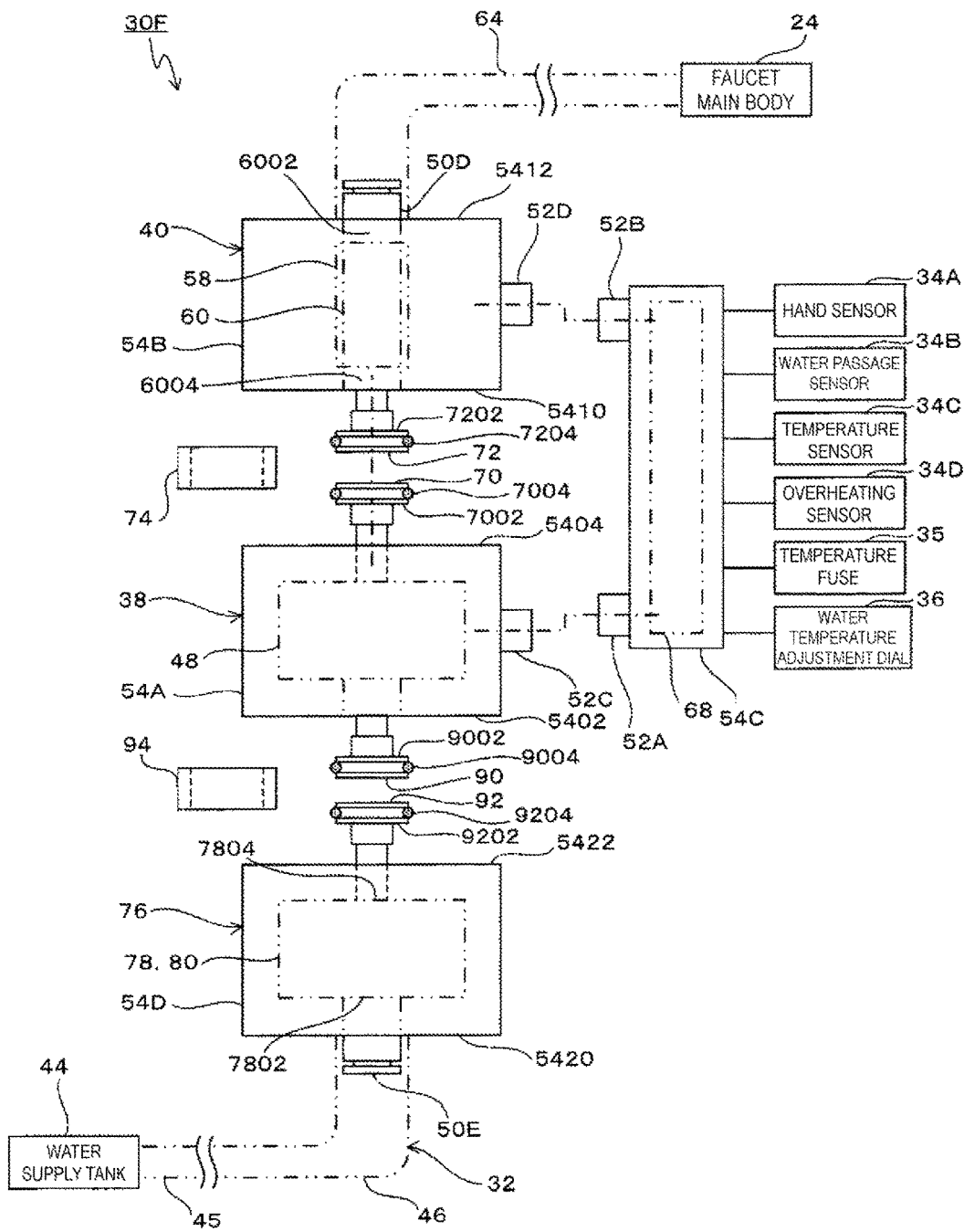
FIG. 10 is an exploded view illustrating a configuration of a faucet device 30F of an aircraft lavatory unit according to a sixth embodiment.
Figure 11:
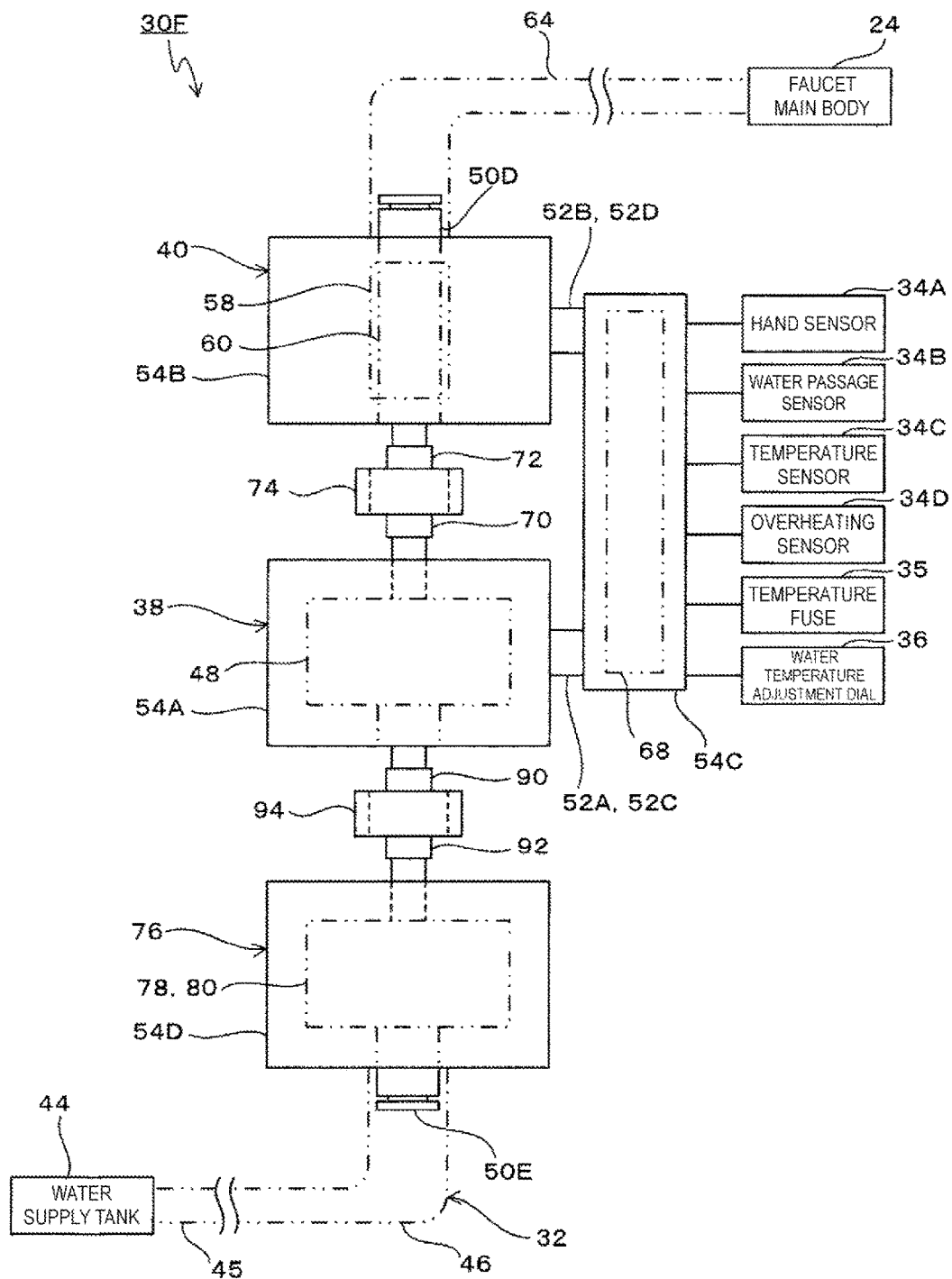
FIG. 11 is an assembly view of the faucet device 30F of the aircraft lavatory unit according to the sixth embodiment.

As illustrated in FIG. 10 and FIG. 11, a first joint 90 of the valve module 38 is formed so as to protrude from the first outer surface 5402 of the first case 54A, a flange portion 9002 that has a larger diameter than that of other portions of the first joint 90 is formed at a tip end of the first joint 90, and an O-ring 9004 is fitted into a groove formed in an outer periphery of the flange portion 9002.

The sixth joint 50F of the water purification module 76 has an identical shape to that of the first joint 90 and is formed so as to protrude from the second outer surface 5422 of the fourth case 54D. A flange portion 9202 that has a larger diameter than that of other portions of a sixth joint 92 is formed at a tip end of the sixth joint 92, and an O-ring 9204 is fitted into a groove formed in an outer periphery of the flange portion 9202.

Similarly to the third embodiment, a holding member (a fastener) 94 is fitted with respect to the first joint 90 and the sixth joint 92, in a state in which axial centers thereof are aligned with each other and tip ends thereof abut against each other, so that the holding member 94 surrounds outer peripheries of the first joint 90 and the sixth joint 92. As a result of the flange portions 9002 and 9202 of the first joint 90 and the sixth joint 92 being sandwiched by the holding member 94, the first joint 90 is joined to the sixth joint 92, and further, a joining state of the joints 90 and 92 is held by the holding member 94.

Therefore, the present embodiment is configured by including the first joint 90, the sixth joint 92, and the holding member 94.

Even in the sixth embodiment described above, a similar effect to that of the fourth embodiment is achieved, and further, it is more advantageous for performing easy attachment and removal of the water purification module 76, the valve module 38, and the heater module 40 to and from one another.

Note that in the fourth to sixth embodiments, a case has been described in which the water purification module 76, the valve module 38, and the heater module 40 are disposed in this order from the upstream side toward the downstream side of the water flowing in the water supply channel 32.

However, the water purification module 76, the valve module 38, and the heater module 40 can be disposed in a desired order by causing the two fifth and sixth joints 50E and 50F of the water purification module 76 to be removably joined to the water supply channel 32 or any one of the first to fourth joints 50A, 50B, 50C, and 50D.

Further, it is needless to say that the male and female joining members that connect the first case 54A, the second case 54B, and the third case 54C are interchangeable.

The invention claimed is:

1. A faucet device for an aircraft lavatory unit comprising:
a faucet main body;
a water supply pipe;
a water supply channel that connects the water supply pipe and the faucet main body;
a water supply valve disposed in the water supply channel;
a heater for heating water supplied from the water supply channel; and
a controller for performing control of an opening and closing operation of the water supply valve and a heating operation of the heater, the faucet device for the aircraft lavatory unit further comprising:
a valve module and a heater module that are disposed in series in a section of the water supply channel,
the valve module including a first case, a first joint that is provided in a surface of the first case and is removably joined to the water supply channel as a first quick-release joint comprising one of an O-ring or a groove and configured to join to another one of the O-ring or the groove on the water supply channel, a second joint that is provided in the surface of the first case at a different location from that of the first joint, and the water supply valve that is integrated in the first case and connects the first joint and the second joint, and
the heater module including a second case, a third joint that is provided in a surface of the second case and is removably joined to the second joint as a second quick-release joint comprising one of an O-ring or a groove and configured to join to another one of the O-ring or the groove on the second joint, a fourth joint that is provided in the surface of the second case at a different location from that of the third joint and removably joined to the water supply channel as a third quick-release joint comprising one of an O-ring or a groove and configured to join to another one of the O-ring or the groove on the water supply channel, a water channel for heating that is integrated in the second case and connects the third joint and the fourth joint, and the heater that is integrated in the second case and heats water flowing in the water channel for heating, the controller having a fifth joint for removably joining to the first case and a sixth joint for removably joining to the second case, the fifth and sixth joints each omitting a wiring member passing from the controller to the first and second cases, respectively, wherein in a state that the valve module and the heater module are joined in series via the second joint and the third joint, a portion of the first case in which the second joint is provided and a portion of the second case in which the third joint is provided abut against each other, the first case having screw holes and the second case having screw through holes at a first end and a second end opposing the first end of the second case, the faucet device further comprises screw members configured to be inserted from the screw through holes at the first end of the second case through the screw through holes at the second end of the second case and screwed into the screw holes of the first case to fasten and hold the first case and the second case together in the state that the valve module and the heater module are joined, and the valve module and the heater module are directly connected via the second and third joints.

2. A faucet device for an aircraft lavatory unit, comprising:

a faucet main body;

a water supply pipe;

a water supply channel that connects the water supply pipe and the faucet main body;

a water supply valve disposed in the water supply channel;

a heater for heating water supplied from the water supply channel; and a controller for performing control of an opening and closing operation of the water supply valve and a heating operation of the heater, the faucet device for the aircraft lavatory unit further comprising:

a valve module and a heater module that are disposed in series in a section of the water supply channel, the valve module including a first case, a first joint that is provided in a surface of the first case and is removably joined to the water supply channel as a first quick-release joint comprising one of an O-ring or a groove and configured to join to another one of the O-ring or the groove on the water supply channel, a second joint that is provided in the surface of the first case at a different location from that of the first joint, and the water supply valve that is integrated in the first case and connects the first joint and the second joint, and the heater module including a second case, a third joint that is provided in a surface of the second case and is removably joined to the second joint as a second quick-release joint comprising one of an O-ring or a groove and configured to join to another one of the O-ring or the groove on the second joint, a fourth joint that is provided in the surface of the second case at a different location from that of the third joint and removably joined to the water supply channel as a third quick-release joint comprising one of an O-ring or a groove and configured to join to another one of the O-ring or the groove on the water supply channel, a water channel for heating that is integrated in the second case and connects the third joint and the fourth joint, and the heater that is integrated in the second case and heats water flowing in the water channel for heating, the faucet device further comprises holding members each having L-shaped cross-sections at both ends thereof, the holding members being configured to hold connection between the first case and the second case together at the ends in a state in which the valve module and the heater module are joined in series via the second joint and the third joint; and the controller having a fifth joint for removably joining to the first case and a sixth joint for removably joining to the second case, the fifth and sixth joints each omitting a wiring member passing from the controller to the first and second cases, respectively;

wherein the valve module and the heater module are directly connected via the second and third joints.

3. The faucet device for the aircraft lavatory unit according to claim 2 further comprising: a first connector that outputs a first control signal from the controller to the valve module; a second connector that outputs a second control signal from the controller to the heater module; and a controller module that is integrated into a third case, wherein a third connector that is removably joined to the first connector is integrated into the first case, and a fourth connector that is removably joined to the second connector is integrated into the second case.

4. The faucet device for the aircraft lavatory unit according to claim 2, further comprising: a water purification module that is disposed in a section of the water supply channel and in series with the valve module and the heater module, wherein the water purification module includes a fourth case, two fifth and sixth joints that are provided in a surface of the fourth case at different locations from each other and are removably joined to the water supply channel or any one of the first to fourth joints, a water purification water channel that is integrated into the fourth case and connects the fifth joint and sixth joint, and water purifier that is integrated into the fourth case and purifies water flowing in the water purification water channel.

5. The faucet device for the aircraft lavatory unit according to claim 4, wherein in a state in which the valve module, the heater module, and the water purification module are joined in series via the joints, portions of the cases in which the joints are located abut against one another, the joints being joined together while joining adjacent modules, and screw members are provided that fasten the cases in a direction that causes the portions of the cases to abut against one another.

6. The faucet device for the aircraft lavatory unit according to claim 4, wherein in a state in which the valve module, the heater module, and the water purification module are joined in series via the joints, a holding member is provided on which the first case, the second case, and the fourth case are separately mounted and which holds the first case, the second case, and the fourth case.

7. The faucet device for the aircraft lavatory unit according to claim 1, further comprising: a first connector that outputs a first control signal from the controller to the valve module; a second connector that outputs a second control signal from the controller to the heater module; and a controller module that is integrated into a third case, wherein a third connector that is removably joined to the first connector is integrated into the first case, and a fourth connector that is removably joined to the second connector is integrated into the second case.

8. The faucet device for the aircraft lavatory unit according to claim 1, further comprising: a water purification module that is disposed in a section of the water supply channel and in series with the valve module and the heater module, wherein the water purification module includes a fourth case, two fifth and sixth joints that are provided in a surface of the fourth case at different locations from each other and are removably joined to the water supply channel or any one of the first to fourth joints, a water purification water channel that is integrated into the fourth case and connects the fifth joint and sixth joint, and water purifier that is integrated into the fourth case and purifies water flowing in the water purification water channel.

9. The faucet device for the aircraft lavatory unit according to claim 8, wherein in a state in which the valve module, the heater module, and the water purification module are joined in series via the joints, portions of the cases in which the joints are located abut against one another, the joints being joined together while joining adjacent modules, and screw members are provided that fasten the cases in a direction that causes the portions of the cases to abut against one another.

10. The faucet device for the aircraft lavatory unit according to claim 8, wherein in a state in which the valve module, the heater module, and the water purification module are joined in series via the joints, a holding member is provided on which the first case, the second case, and the fourth case are separately mounted and which holds the first case, the second case, and the fourth case.

11. The faucet device for the aircraft lavatory unit according to claim 8, wherein the joints that join the valve module, the heater module, and the water purification module are configured by including a holding member that causes the joints to be removably joined and holds a state in which the joints are joined.

12. The faucet device for the aircraft lavatory unit according to claim 1, further comprising: a first connector that outputs a first control signal from the controller to the valve module; a second connector that outputs a second control signal from the controller to the heater module; and a controller module that is integrated into a third case, wherein a third connector that is removably joined to the first connector is integrated into the first case, and a fourth connector that is removably joined to the second connector is integrated into the second case.

13. The faucet device for the aircraft lavatory unit according to claim 1, further comprising: a water purification module that is disposed in a section of the water supply channel and in series with the valve module and the heater module, wherein the water purification module includes a fourth case, two fifth and sixth joints that are provided in a surface of the fourth case at different locations from each other and are removably joined to the water supply channel or any one of the first to fourth joints, a water purification water channel that is integrated into the fourth case and connects the fifth joint and sixth joint, and water purifier that is integrated into the fourth case and purifies water flowing in the water purification water channel.

14. The faucet device for the aircraft lavatory unit according to claim 13, wherein in a state in which the valve module, the heater module, and the water purification module are joined in series via the joints, portions of the cases in which the joints are located abut against one another, the joints being joined together while joining adjacent modules, and screw members are provided that fasten the cases in a direction that causes the portions of the cases to abut against one another.

15. The faucet device for the aircraft lavatory unit according to claim 13, wherein in a state in which the valve module, the heater module, and the water purification module are joined in series via the joints, a holding member is provided on which the first case, the second case, and the fourth case are separately mounted and which holds the first case, the second case, and the fourth case.

16. The faucet device for the aircraft lavatory unit according to claim 13, wherein the joints that join the valve module, the heater module, and the water purification module are configured by including a holding member that causes the joints to be removably joined and holds a state in which the joints are joined.

17. A faucet device for an aircraft lavatory unit, comprising:
a faucet main body;
a water supply pipe;
a water supply channel that connects the water supply pipe and the faucet main body;
a water supply valve disposed in the water supply channel;
a heater for heating water supplied from the water supply channel; and
a controller for performing control of an opening and closing operation of the water supply valve and a heating operation of the heater, the faucet device for the aircraft lavatory unit further comprising:
a valve module and a heater module that are disposed in series in a section of the water supply channel,
the valve module including a first case, a first joint that is provided in a surface of the first case and is removably joined to the water supply channel as a first quick-release joint comprising one of an O-ring or a groove and configured to join to another one of the O-ring or the groove on the water supply channel, a second joint that is provided in the surface of the first case at a different location from that of the first joint, and the water supply valve that is integrated in the first case and connects the first joint and the second joint, and
the heater module including a second case, a third joint that is provided in a surface of the second case and is removably joined to the second joint as a second quick-release joint comprising one of an O-ring or a groove and configured to join to another one of the O-ring or the groove on the second joint, a fourth joint that is provided in the surface of the second case at a different location from that of the third joint and removably joined to the water supply channel as a third quick-release joint comprising one of an O-ring or a groove and configured to join to another one of the O-ring or the groove on the water supply channel, a water channel for heating that is integrated in the second case and connects the third joint and the fourth joint, and the heater that is integrated in the second case and heats water flowing in the water channel for heating,
the faucet device further comprises a clamp device configured to removably join the second joint and the third joint together and to hold connection between the first case and the second case in a state that the valve module and the heater module are joined in series; and
the controller having a fifth joint for removably joining to the first case and a sixth joint for removably joining to the second case, the fifth and sixth joints each omitting a wiring member passing from the controller to the first and second cases, respectively;

wherein the valve module and the heater module are directly connected via the second and third joints.

18. The faucet device for the aircraft lavatory unit according to claim 17, further comprising: a first connector that outputs a first control signal from the controller to the valve module; a second connector that outputs a second control signal from the controller to the heater module; and a controller module that is integrated into a third case, wherein a third connector that is removably joined to the first connector is integrated into the first case, and a fourth connector that is removably joined to the second connector is integrated into the second case.

19. The faucet device for the aircraft lavatory unit according to claim 18, further comprising: a water purification module that is disposed in a section of the water supply channel and in series with the valve module and the heater module, wherein the water purification module includes a fourth case, two fifth and sixth joints that are provided in a surface of the fourth case at different locations from each other and are removably joined to the water supply channel or any one of the first to fourth joints, a water purification water channel that is integrated into the fourth case and connects the fifth joint and sixth joint, and water purifier that is integrated into the fourth case and purifies water flowing in the water purification water channel.

* * * * *